United States Patent [19]

Dubost

[11] Patent Number: 4,883,397
[45] Date of Patent: Nov. 28, 1989

[54] U-SHAPED FASTENING CLIP DEVICE WITH RESILIENT TONGUE MEMBER

[75] Inventor: Dominique Dubost, Saint Cloud, France

[73] Assignee: RAPID S.A., Paris Cedex, France

[21] Appl. No.: 310,871

[22] Filed: Feb. 15, 1989

[30] Foreign Application Priority Data

Feb. 24, 1988 [FR] France ................ 88 02241

[51] Int. Cl.$^4$ .................. F16B 37/04; B42F 1/02
[52] U.S. Cl. ...................... 411/174; 411/112; 411/522; 24/563; 24/67.9
[58] Field of Search ............ 411/174, 175, 112, 522, 411/523, 524; 24/545, 563, 67.9

[56] References Cited

U.S. PATENT DOCUMENTS

| | | | |
|---|---|---|---|
| 1,621,008 | 3/1927 | Fricker | 24/563 |
| 2,291,219 | 8/1941 | Fontecilla | 24/545 |
| 3,459,096 | 9/1967 | Parkin | 411/523 |
| 4,332,060 | 6/1982 | Sato | 24/67.9 |
| 4,536,924 | 8/1985 | Willoughby | 24/563 |
| 4,684,305 | 8/1987 | Dubost | 411/174 |
| 4,793,753 | 12/1988 | Muller et al. | 411/175 |

FOREIGN PATENT DOCUMENTS

| | | |
|---|---|---|
| 0199614 | 10/1986 | European Pat. Off. . |
| 0224746 | 6/1987 | European Pat. Off. . |
| 2234353 | 2/1973 | Fed. Rep. of Germany ...... 411/112 |
| 0093127 | 2/1969 | France . |
| 2489903 | 3/1982 | France . |
| 6175 | of 1898 | United Kingdom ................ 24/67.9 |
| 1190378 | 5/1970 | United Kingdom ................ 411/112 |

Primary Examiner—Gary L. Smith
Assistant Examiner—Flemming Saether
Attorney, Agent, or Firm—Kenyon & Kenyon

[57] ABSTRACT

A fastening clip device which includes a resiliently deformable U-shaped clip having two legs connected by a base. An arc-shaped tongue originating from one of the legs has a free end which can exit through or cooperate with the edge of an opening. By virtue of this construction, the clip is maintained open before clipping and allowed to close after clipping.

6 Claims, 1 Drawing Sheet

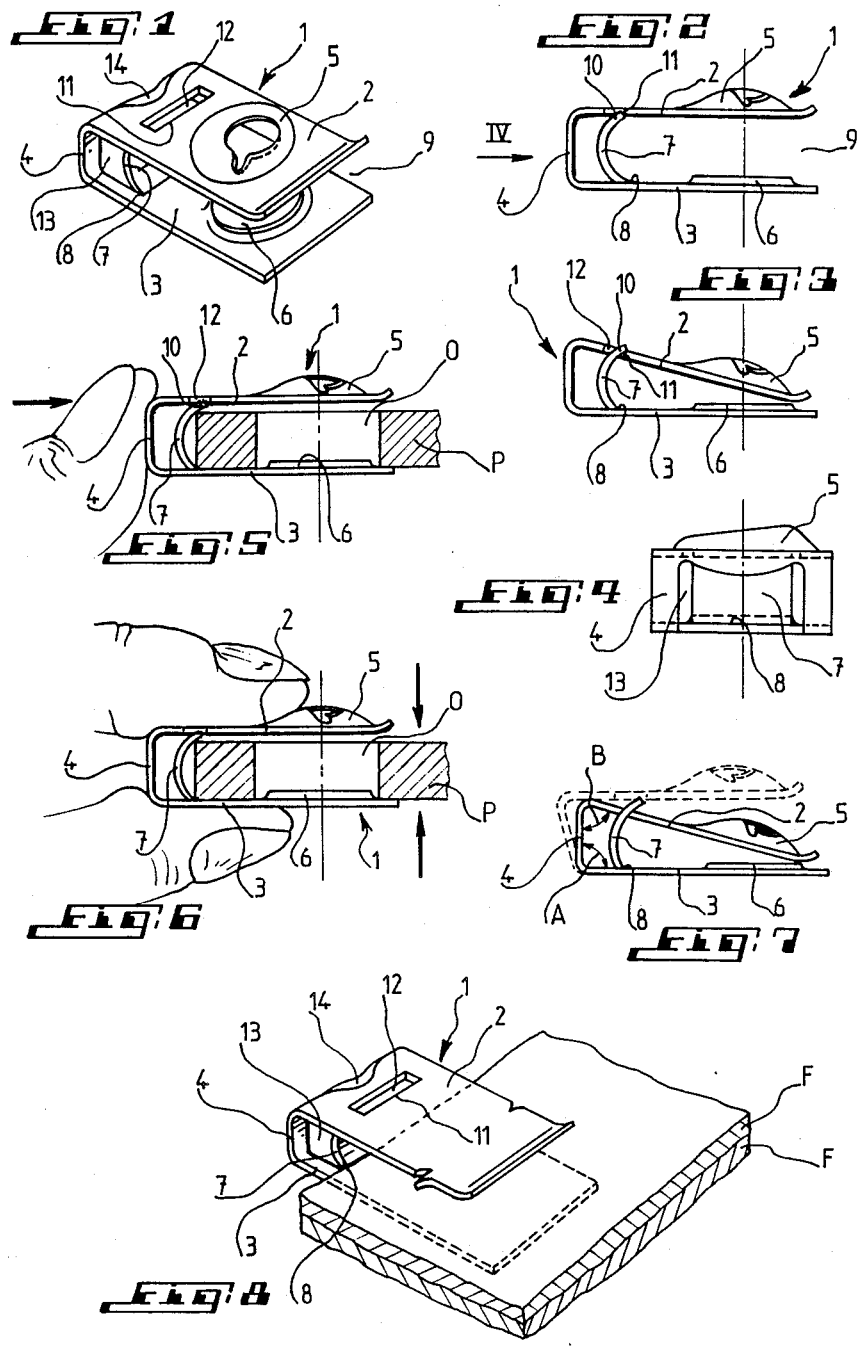

U-SHAPED FASTENING CLIP DEVICE WITH RESILIENT TONGUE MEMBER

BACKGROUND OF THE INVENTION

The present invention relates to a fastening clip device which can be used for holding together any articles, such as for example documents, or which can constitute a nut making it possible for example to fasten a panel to another panel.

It relates also to a piece fulfilling one or several functions and to which is incorporated the above device.

With particular reference to the U.S/ Pat. No. 4,684,305 filed on Mar. 20, 1986 and belonging to the Applicant, a substantially U-shaped fastening clip device has already been proposed, which is resiliently deformable and which can be fitted by its legs onto the edge of an article or a group of articles, this device comprising a member interposed between the two legs of the U-shaped element so as to hold said legs apart prior to fitting onto the edge of the article on the one hand, and so as to enable them to be closed after being fitted onto the edge of the article due to the fact that the said member leaves one of the legs of the U-shaped element on the other hand.

However, the above device, although being entirely satisfactory, presented a relatively complex and costly structure as well concerning the legs of the U-shaped element of the clip as concerning the member interposed in a sliding manner between these legs and which was mounted in a loose manner with respect to these legs, and which therefore was likely to be lost.

SUMMARY OF THE INVENTION

Thus, the present invention relates to a fastening clip device which remedies particularly the above drawbacks as it constitutes an assembly consisting of a single piece having a much simpler and therefore less costly structure than that of the above-mentioned device.

To this end, the invention relates to an improved fastening clip device of the type substantially in the form of a resiliently deformable U-shaped element adapted to be fitted by its legs onto the edge of an article, and comprising a member interposed between the two legs in order to enable these legs to be maintained in a spaced apart position prior to the fitting onto the edge of the article on the one hand, and to enable the legs to be closed after the fitting onto the edge of the article due to the fact that the said member leaves one of the legs of the U-shaped element on the other hand, characterized in that this member and one of the legs of the U-shaped element consist of a single piece and in that this member is constituted by a resilient tongue or the like originating from this leg and the free end of which can either co-operate with or leave one edge of the other leg.

According to another feature of this device, the aforesaid tongue is a curved or arc-shaped tongue whose concavity faces the open portion of the U-shaped element.

The free end of this arc-shaped tongue co-operates with the edge of an opening made in the leg of the U-shaped element opposite to that from which the said tongue originates.

According to a preferred embodiment, the aforesaid tongue results from a cut made partly in the handle-shaped portion connecting the two legs of the U-shaped element and partly in the leg of the U-shaped element from which this tongue originates.

The device according to this invention is further characterized by a rib or the like provided between the cut and the aforesaid opening.

This rib imparts advantageously a stiffness at the connection of one of the legs to the base of the U-shaped element so that only the zone of connection of the other leg of the U-shaped element to the base of this U-shaped element will be capable of pivoting as the legs are being spaced apart or brought closer.

The device according to this invention can be used for holding together any articles or can also be used as a nut which can be fitted onto the edge of a panel.

To this end, the leg of the U-shaped element comprising the aforesaid opening comprises also an impression or an internally-threaded barrel or even a nut adapted to co-operate with the thread of a threaded member, whereas the other leg of the U-shaped element from which the tongue originates comprises an opening for the passage of this threaded member.

BRIEF DESCRIPTION OF THE DRAWINGS

Other features and advantages of the invention will appear more clearly as the following detailed description proceeds with reference to the appended drawings given solely by way of example and wherein:

FIG. 1 is a perspective view of a nut device according to the principles of the invention;

FIG. 2 is an elevational side view of this device shown in the open position in tension;

FIG. 3 is a view similar to FIG. 2 but showing the device in the closed and released position;

FIG. 4 is an end view of the device in the direction of arrow IV of FIG. 2;

FIGS. 5 and 6 are elevational side views of the device according to the invention showing how this device is fitted onto a panel (FIG. 5) and how the device pinches this panel (FIG. 6);

FIG. 7 is an elevational side view showing the open and closed positions of the device and thus how it is deformed; and FIG. 8 is a perspective view of a device according to the invention which does not constitute a nut but a simple clip to hold together various articles.

DESCRIPTION OF THE PREFERRED EMBODIMENTS

Referring to the Figures a fastening clip device is seen which comprises essentially a resiliently deformable U-shaped part 1 comprising two resilient legs 2 and 3 connected to each other by a portion 4 having in a way the shape of a handle and forming the base of the U-shaped element.

Among the legs of the U-shaped element, the leg 2 may comprise an impression 5 forming in a way an internal thread adapted to co-operate with the thread of a threaded member (not shown) while the other leg 3 comprises an opening 6 enabling this threaded member to pass therethrough, the latter being able to pass through the opening O of a panel P when the device is fitted and mounted onto the edge of the panel P, as seen in FIGS. 5 and 6.

As seen in FIG. 8, the legs 2 and 3 may quite as well comprise no impression 5 and no opening 6 respectively, so that the device constitutes a simple clip adapted to hold together several articles F which are joined side by side.

All the above arrangements are known and require no additional explanations.

According to the invention, the member which is interposed between the legs 2 and 3 of the U-shaped element 1 to enable them to be maintained in the spaced apart position before the fitting onto the edge of an article on the one hand, and to be closed after the fitting onto the edge of this article on the other hand, is formed of a resilient tongue 7 which consists of a single piece with the U-shaped element 1 and which originates from one 3 of the legs of the U-shaped element, as indicated at 8 in the Figures.

Preferably, this tongue is a curved or arc-shaped tongue whose concavity faces the open portion 9 of the U-shaped element.

The free end 10 of the tongue 7 co-operates with the edge 11 of an opening 12 made in the leg 2 of the U-shaped element opposite to the leg 3 from which the said tongue originates.

According to the embodiment shown, the tongue 7 is obtained by a cut 13 made partly in the base 4 of the U-shaped element 1 and partly in the leg 3 of the U-shaped element from which the tongue 7 originates, as clearly seen in FIGS. 1, 4 and 8.

A stiffening rib shown at 14 in FIGS. 1 and 8 is located in the zone of the connection of leg 2 to the base 4 of the U-shaped element between the cut 13 and the opening 12.

From the foregoing it is thus understood that the clip device according to this invention constitutes a single piece with particularly simple and reliable mechanical structure and operation as will be shown below.

In order to put the clip into tension, i.e. to hold the two legs 2 and 3 in the spaced apart position, one just has to space apart the legs 2 and 3 of the U-shaped element at its open portion 9, so that the free end 10 of the tongue 7 will engage the edge 11 of the opening 12, as clearly seen in FIGS. 2 and 5.

Thereafter, the clip is fitted onto the edge of a panel P or of articles F to be gathered, as seen in FIGS. 5 and 8.

In the fitted position, one can proceed in two different ways to close the clip, i.e. to remove the free end 10 of the tongue 7 from the edge 11 of the opening 12. One can exert a pressure onto the base 4 of the U-shaped element 1 so that the tongue 7 is deformed by resting onto the edge of the panel P or of articles F, and thus leaves the edge 11 of the opening 12. As seen in FIG. 6, one can slso exert a pressure on the legs 2 and 3 of the U-shaped element, which will also provoke the removal of the free end 10 of the arc-shaped tongue 7 form the edge 11 of the opening 12.

From the foregoing it is thus understood that the passage from the opening position to the closed position of the clip is reversible, the closed position being obtained as disclosed above and the coming back to the open position being obtained by the opening of the ends of the legs of the U-shaped element of the clip.

Besides, it is to be noted here that the open position of the clip is maintained by a controlled elastic deformation of the said clip. Referring to FIG. 7, it is seen that this deformation is asymetric so as to provoke an opening of the angle A, (zone of connection of the leg 3 to the base 4 of the U-shaped element), whereas the angle B (zone of connection of the leg 2 to the base 4 of the U-shaped element) remains substantially constant, due to the stiffening rib 14, which, as clearly shown by the dotted lines in FIG. 7, enables the portion of the clip forming the angle B to rotate around the portion of the clip forming the angle A, so as to obtain the spacing apart of the legs 2 and 3 until the free end 10 of the tongue 7 engages the edge 11 of the opening 12 in the leg 2.

According to the invention, there is therefore obtained a fastening clip device consisting of a single piece, having particularly simple, reliable and inexpensive design, and which can have a multiplicity of applications.

Of course, the invention is by no means limited to the forms of embodiment described and illustrated which have been given by way of example only.

Indeed, the tongue 7 originating from the leg 3 could be straight rather than curved, could be formed in another way than by a cut made in the material of the clip, or could originate from a location other than that shown, without departing from the scope of the invention.

Thus, the tongue 7 could originate from the side or sides of the leg 3, and its free end could co-operate with the edges of the leg 2.

Besides, whether this clip does or does not constitute a nut, it may be integral with or incorporated into a piece fulfilling other functions, without departing from the scope of the invention.

The invention therefore includes all technical equivalents to the means described as well as their combinations if the latter are carried out according to its spirit.

What is claimed is:

1. A resiliently deformable U-shaped fastening clip adapted to be clipped onto the edge of an article, the clip comprising:
   two resilient legs;
   a portion connecting the two resilient legs to one another;
   a resilient tongue, the tongue member comprising a first end integrally connected to a first one of the two legs and a second end which is free, the tongue extending between the two legs for maintaining the two legs in a spaced apart position before the clip is clipped onto the article and for allowing the two legs to remain in a closed position after being clipped onto the article;
   a tongue member receiving portion formed in the second one of the two legs;
   the free end of the tongue member contacting the second leg to maintain the two legs in a spaced apart position before the clip is clipped onto the article and the free end being movable to a position in which the tongue is received in the tongue member receiving portion of the second leg so as to allow the two legs to remain in a closed position after being clipped onto the article.

2. A device according to claim 1, wherein the tongue is arc-shaped and has a concavity which faces the open portion of the U-shaped element.

3. A device according to claim 1, wherein the tongue member receiving portion comprises an opening formed in the second leg and the free end of the tongue cooperates with the edge of member receiving opening.

4. A device according to claim 1, wherein the tongue member is defined by a cut made partly in the portion connecting the two legs and partly in the first leg.

5. A device according to claim 4, further comprising a rib provided between the cut and the tongue member receiving portion.

6. A device according to claim 1, wherein the second leg of the U-shaped clip further comprises at least one of an impression, an internally threaded barrel and a nut adapted to cooperate with the thread of a threaded member, the first leg of the U-shaped clip comprising an opening for the passage of a threaded member.

* * * * *